United States Patent
Stoner et al.

(10) Patent No.: US 10,399,499 B2
(45) Date of Patent: Sep. 3, 2019

(54) SERVICE ACCESS WALKWAY FOR A ROTARY MIXER MACHINE

(71) Applicant: Caterpillar Paving Products Inc., Brooklyn Park, MN (US)

(72) Inventors: Matthew David Stoner, Savage, MN (US); Roger Allen Hedlund, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/792,950

(22) Filed: Oct. 25, 2017

(65) Prior Publication Data

US 2019/0118718 A1    Apr. 25, 2019

(51) Int. Cl.
*B60R 3/00* (2006.01)
*E02F 9/08* (2006.01)

(52) U.S. Cl.
CPC ............ *B60R 3/005* (2013.01); *E02F 9/0833* (2013.01); *B60Y 2200/41* (2013.01)

(58) Field of Classification Search
CPC ........... B60R 3/005; B60R 3/02; E02F 9/0833
See application file for complete search history.

(56) References Cited

U.S. PATENT DOCUMENTS

| | | | | |
|---|---|---|---|---|
| 6,068,277 A * | 5/2000 | Magnussen | ............... | B60R 3/02 182/127 |
| 6,880,843 B1 * | 4/2005 | Greer, Jr. | .................. | B60R 3/02 280/166 |
| 7,753,171 B2 * | 7/2010 | Castagno | .................. | E06C 5/04 182/127 |
| 8,454,043 B2 * | 6/2013 | Uto | ........................ | E02F 9/0833 280/163 |
| 8,668,217 B2 * | 3/2014 | Ziaylek | ..................... | B60R 3/02 280/163 |
| 8,678,411 B2 * | 3/2014 | Kibler | ........................ | E06C 5/06 182/127 |
| 9,022,405 B2 * | 5/2015 | Kibler | ........................ | B60R 3/02 182/127 |
| 9,487,148 B2 | 11/2016 | Kichline, Jr. et al. | | |
| 2007/0125598 A1 * | 6/2007 | Castagno | .................. | E06C 5/04 182/127 |
| 2007/0182121 A1 * | 8/2007 | Kraimer | ............. | B66F 9/07545 280/166 |
| 2010/0181741 A1 * | 7/2010 | Webb | ........................ | B60R 3/02 280/166 |

(Continued)

FOREIGN PATENT DOCUMENTS

| | | |
|---|---|---|
| CN | 204185896 | 3/2015 |
| CN | 204370501 | 6/2015 |

(Continued)

*Primary Examiner* — Hau V Phan

(57) ABSTRACT

A service access walkway for a rotary mixer machine is provided. The service access walkway includes a first walkway section and a second walkway section pivotally coupled to the first walkway section by at least one hinge. The second walkway section is configured to pivot between a closed position and an open position. The service access walkway further includes a magnetic assembly configured to magnetically engage the second walkway section with the rotary mixer machine when the second walkway section is in the closed position.

17 Claims, 6 Drawing Sheets

(56) References Cited

U.S. PATENT DOCUMENTS

| | | | | |
|---|---|---|---|---|
| 2010/0264618 | A1* | 10/2010 | Agoncillo | B60R 3/02 |
| | | | | 280/166 |
| 2012/0060436 | A1* | 3/2012 | Zimmer, II | F41H 5/06 |
| | | | | 52/202 |
| 2012/0104721 | A1* | 5/2012 | Genest | B60R 3/02 |
| | | | | 280/166 |
| 2015/0211208 | A1* | 7/2015 | Capraro | E02F 9/0833 |
| | | | | 182/81 |
| 2015/0246642 | A1 | 9/2015 | Vernickel et al. | |
| 2016/0001707 | A1 | 1/2016 | Madera et al. | |
| 2016/0129844 | A1* | 5/2016 | Magnussen | B60R 3/005 |
| | | | | 280/760 |
| 2016/0177541 | A1* | 6/2016 | Shimizu | B60R 3/02 |
| | | | | 182/82 |

FOREIGN PATENT DOCUMENTS

| | | |
|---|---|---|
| KR | 20140080858 | 7/2014 |
| WO | 20130132669 | 9/2013 |

\* cited by examiner

SERVICE ACCESS WALKWAY FOR A ROTARY MIXER MACHINE

TECHNICAL FIELD

The present disclosure relates generally to a rotary mixer machine. More particularly, the present disclosure relates to a service access walkway for the rotary mixer machine.

BACKGROUND

Rotary mixer machines are known to stabilize soil surfaces (soil stabilization) and reclaim deteriorated road surfaces (road reclamation). Such machines, typically include a mixing chamber and one or more rotors to reclaim and/or stabilize the underlying work surfaces. An operator of the machine and/or a service personnel may need to access engine and other components of the machine for various purposes, such as servicing and/or repairing. A service access walkway may be provided on the machine to facilitate access to the various serviceable components, such as the engine, transmission components, etc. Such service access walkways are generally affixed to a frame of the machine and to each other using bolts and fasteners. However, there may be component(s), such as the engine, which lies underneath the service access walkway. When service is required far these systems or components the service access walkways must first be detached and unfastened using tools, which can be a cumbersome and time-consuming task.

US Patent Publication no. 2015/0246642 (hereinafter referred to as the '642 publication) relates to a work machine, in particular in the form of a dump truck or of a truck, having an upper deck arranged at the front above a bumper, which can be walked on, and having an operator's cabin arranged laterally on the upper deck with at least one step-like access system arranged in front of the operator's cabin. An intermediate stand lowered with respect to the upper deck is arranged in front of the operator's cabin and steps lead in each case laterally to the upper deck from this while steps lead at least to the bumper from the intermediate stand to the front in the direction of travel.

SUMMARY

In an aspect of the present disclosure, service access walkway for a rotary mixer machine is provided. The service access walkway includes a first walkway section and a second walkway section pivotally coupled to the first walkway section by at least one hinge. The second walkway section is configured to pivot between a closed position and an open position. The service access walkway further includes a magnetic assembly configured to magnetically engage the second walkway section with the rotary mixer machine when the second walkway section is in the closed position.

In another aspect of the present disclosure, a rotary mixer machine is provided. The rotary mixer machine includes a frame, one or more serviceable components disposed on the frame and a service access walkway to facilitate walkway access to the one or more serviceable components. The service access walkway includes a first walkway section detachably coupled to the frame and a second walkway section pivotally coupled to the first walkway section by at least one hinge. The second walkway section is in a closed position to overlay at least one serviceable component of the one or more serviceable component. The second walkway section is pivotable about the at least one hinge to a series of open positions for providing access to the at least one serviceable component. The service access walkway further includes a magnetic assembly disposed between the frame and the second walkway section and is configured to magnetically engage the second walkway section with the frame when the second walkway section is in the closed position.

In a yet another aspect of the present disclosure, a rotary mixer machine is provided. The rotary mixer machine includes a frame, one or more serviceable components disposed on the frame and a service access walkway to facilitate walkway access to the one or more serviceable components. The service access walkway includes a first walkway section detachably coupled to the frame and a second walkway section pivotally coupled to the first walkway section by at least one hinge. The second walkway section is in a closed position to overlay at least one serviceable component of the one or more serviceable component. The second walkway section is pivotable about the at least one hinge to an open position such that the second walkway section lays flat atop the first walkway section for providing access to the at least one serviceable component. The service access walkway further includes a magnetic assembly disposed between the frame and the second walkway section and is configured to magnetically engage the second walkway section with the frame when the second walkway section is in the closed position.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
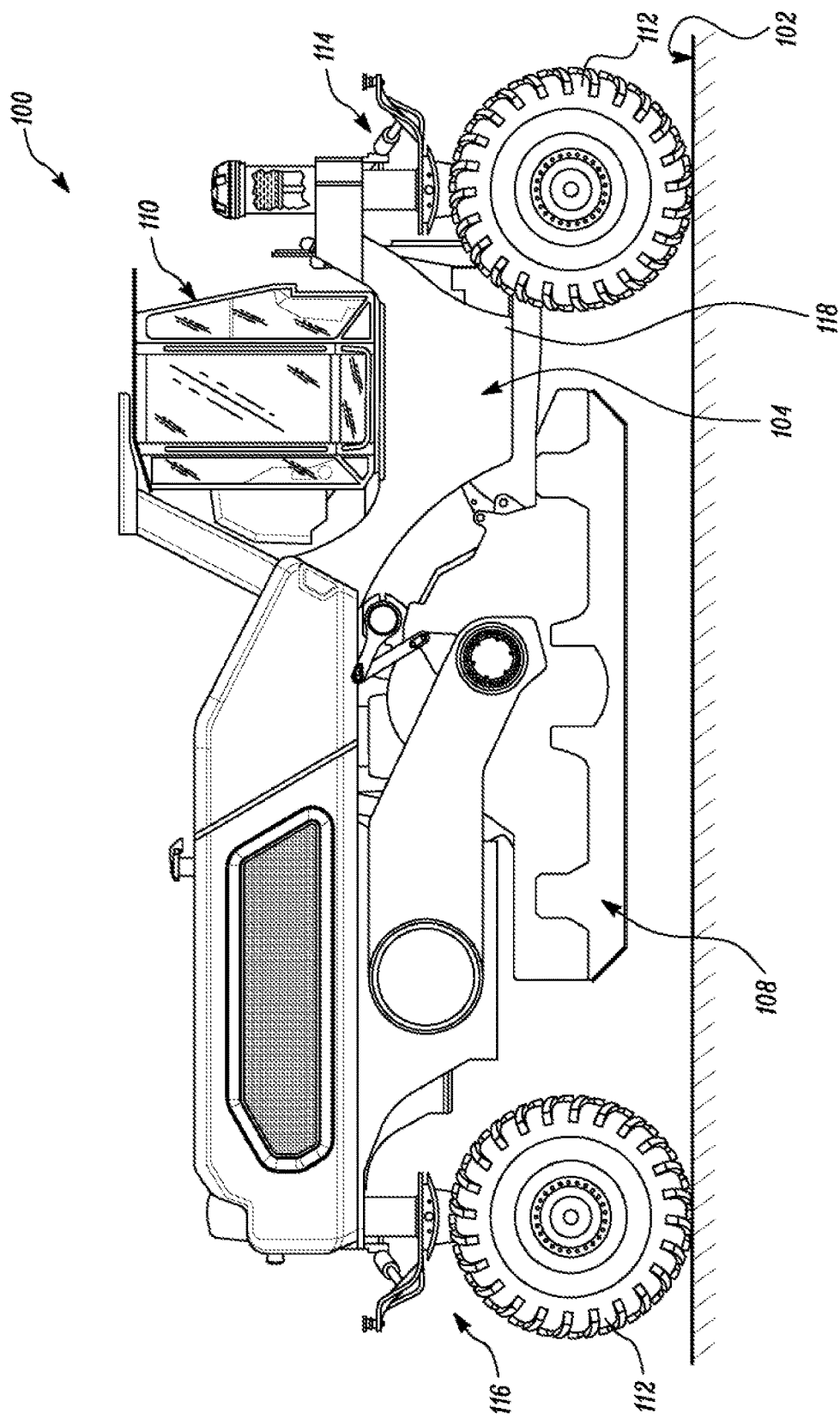
FIG. 1 illustrates a side view of an exemplary machine, in accordance with an embodiment of the present disclosure.
Figure 2:
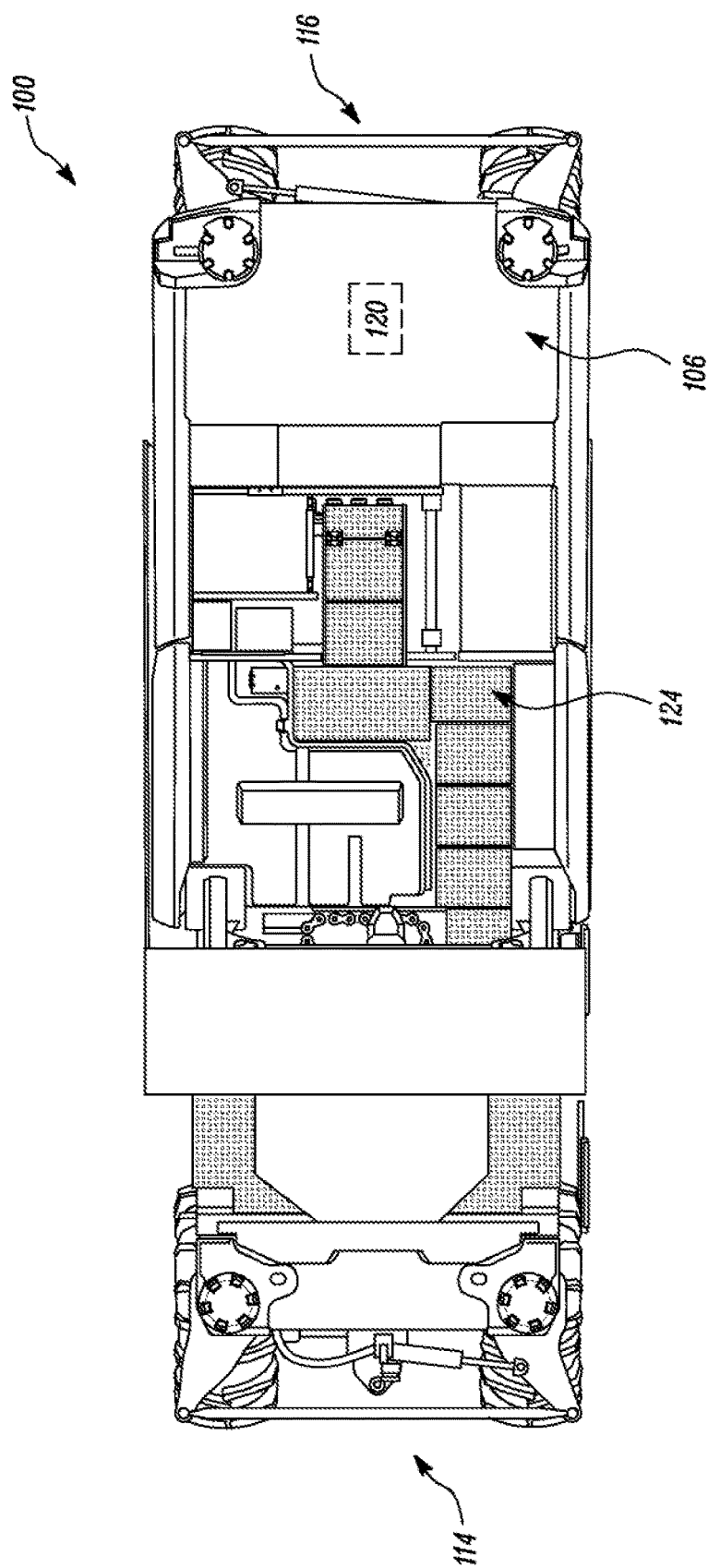
FIG. 2 illustrates a top view of the machine of FIG. 1, in accordance with the embodiments of the present disclosure.

The present disclosure relates to a service access walkway for a machine, such as a rotary mixer machine. FIG. 1 illustrates an exemplary machine 100 according to an embodiment of the present disclosure. FIG. 2 illustrates a top view of the machine 100. The machine 100, as disclosed herein, is embodied as a rotary mixer machine. Other examples of the machine 100 may include, but not limited to, a recycles, a cold planar, or any other miller machine configured to grind or pulverize a work surface 102. In an embodiment, the work surface 102 may be a paved surface such as a road surface. Alternatively, the work surface 102 may be a non-paved surface. For example, additives may be mixed with the grounded and/or pulverized material, during grinding and/or pulverization, for stabilizing a soil or a layer of the work surface 102.

Referring to FIGS. 1 and 2, the machine 100 includes a frame 104, an engine compartment 106, a milling assembly 108, an enclosed operator cabin 110, and a plurality of traction units 112. The frame 104 includes a front end 114 and a rear end 116, and acts as a support or mounting structure for various components, systems or assemblies of the machine 100, for example, the engine compartment 106, the milling assembly 108, the operator cabin 110, the traction units 112, and so on. The frame 104 further includes a first lateral side 118 that corresponds to a flush cut side of the machine 100, and a second lateral side (not shown) opposite to the first lateral side 118 that corresponds to a non-flush cut side of the machine 100.

The engine compartment 106 may be disposed proximate to the rear end 116 of the frame 104, and may be coupled to the frame 104. The engine compartment 106 may house an engine 120 (shown in FIG. 2) of the machine 100. The engine 120 may be connected to and supported by the frame 104, and may be configured to power a transmission system (not shown) and various other systems and components of the machine 100. The traction units 112 are connected to the frame 104, and configured to receive power from the engine 120 to propel the machine 100 along the work surface 102. Although the traction units 112 are depicted as wheels, it may be understood that other devices, such as but not limited to crawler tracks or the like may also be employed.

The milling assembly 108 may be disposed below the frame 104, and may be coupled to a bottom side of the frame 104. In an embodiment, the milling assembly 108, at least partly, may be disposed between the engine compartment 106 and the front end 114 of the frame 104 along a longitudinal direction of the machine 100. It may be contemplated that the milling assembly 108 may include a milling chamber and a rotor (not shown) disposed within the milling chamber. The rotor may be driven by a drive assembly and may include a plurality of cutting elements mounted on an outer periphery of a rotor drum to grind and/or pulverize the work surface 102. For example, additives may be mixed with the grounded and/or pulverized material, during grinding and/or pulverization, for stabilizing a soil or a layer of the work surface 102. The drive assembly may include a suitable mechanism, such as a chain sprocket arrangement, a belt pully arrangement, a gear assembly, etc., to transfer power from the engine 120 for rotating rotor.

The machine 100 further includes a service access walkway 124 (shown in FIG. 2) configured to provide access, to a service personnel, of one or more serviceable components of the rotary mixer machine 100. For example, the service personnel may walk and stand on the service access walkway 124 to access the serviceable components of the machine 100 for servicing. The service access walkway 124 may include a plurality of walkway sections coupled to each other to form the service access walkway 124 disposed on the machine 100. The serviceable components may include, but not limited to, the engine compartment 106, the engine 120, and/or various other components of the rotary mixer machine 100. The service access walkway 124 is further described in greater detail with reference to FIG. 3 through FIG. 6 in the following description.

In an embodiment of the present disclosure, the service access walkway 124 is disposed above the frame 104 and may be detachably coupled to the frame 104 by means of one or more fasteners. As shown in FIG. 2, the service access walkway 124 may extend, at least partly, between the engine compartment 106 and the operator cabin 110 along a longitudinal direction of the machine 100. Although, the service access walkway 124, as described herein, is disposed between the engine compartment 106 and the operator cabin 110, it may be contemplated that other configurations and positions of the service access walkway 124 may also be implemented without deviating from the scope of the claimed subject matter. It may be further contemplated that the service access walkway 124 may also be used for purposes other than servicing, such as for accessing components of the rotary mixer machine 100 by an operator of the rotary mixer machine 100 during operation of the machine 100 and other times.

Figure 3:
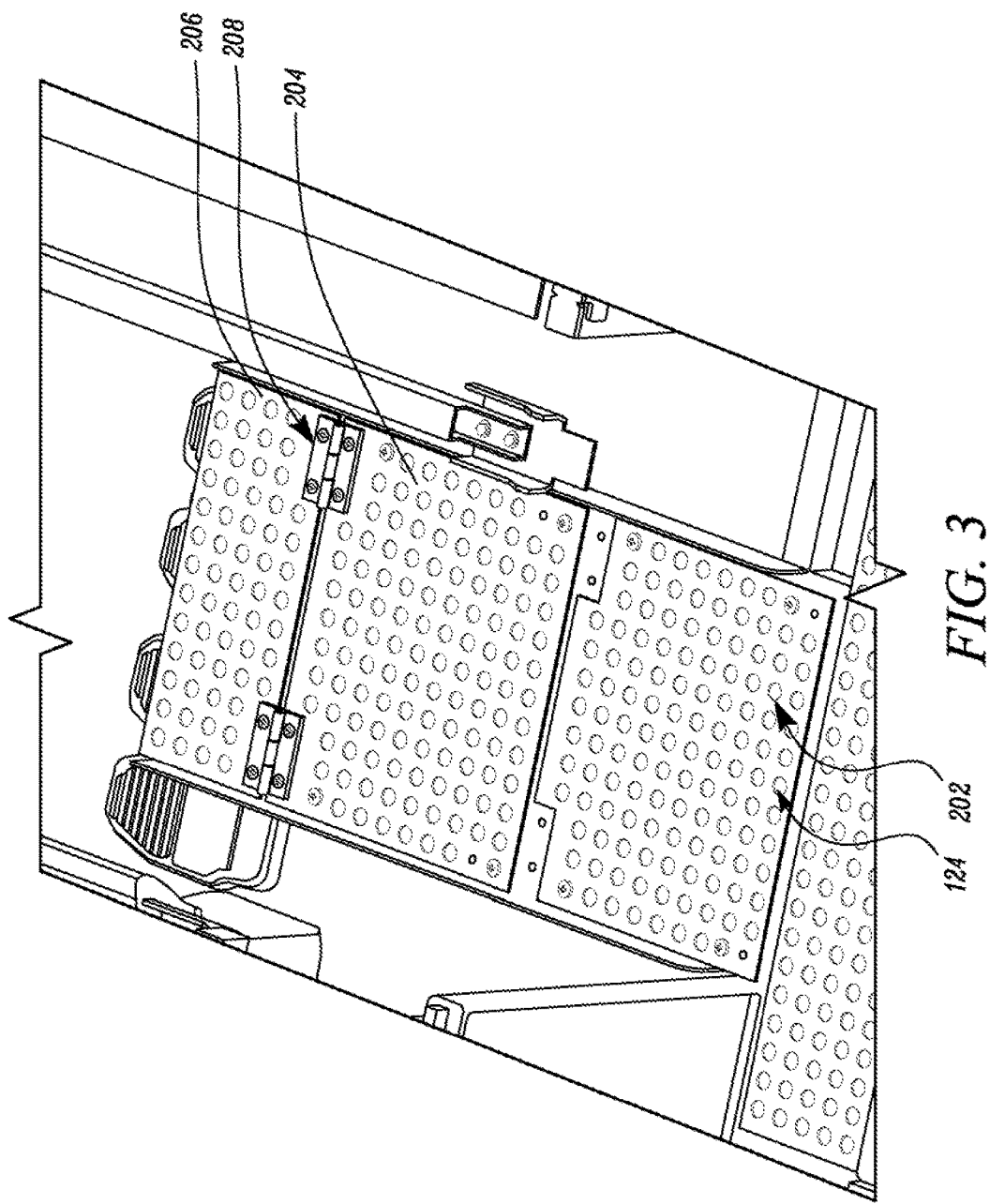
FIG. 3 illustrates a portion of the machine having a service access walkway where a walkway section is in a closed position, in accordance with the embodiments of the present disclosure.
Figure 4:
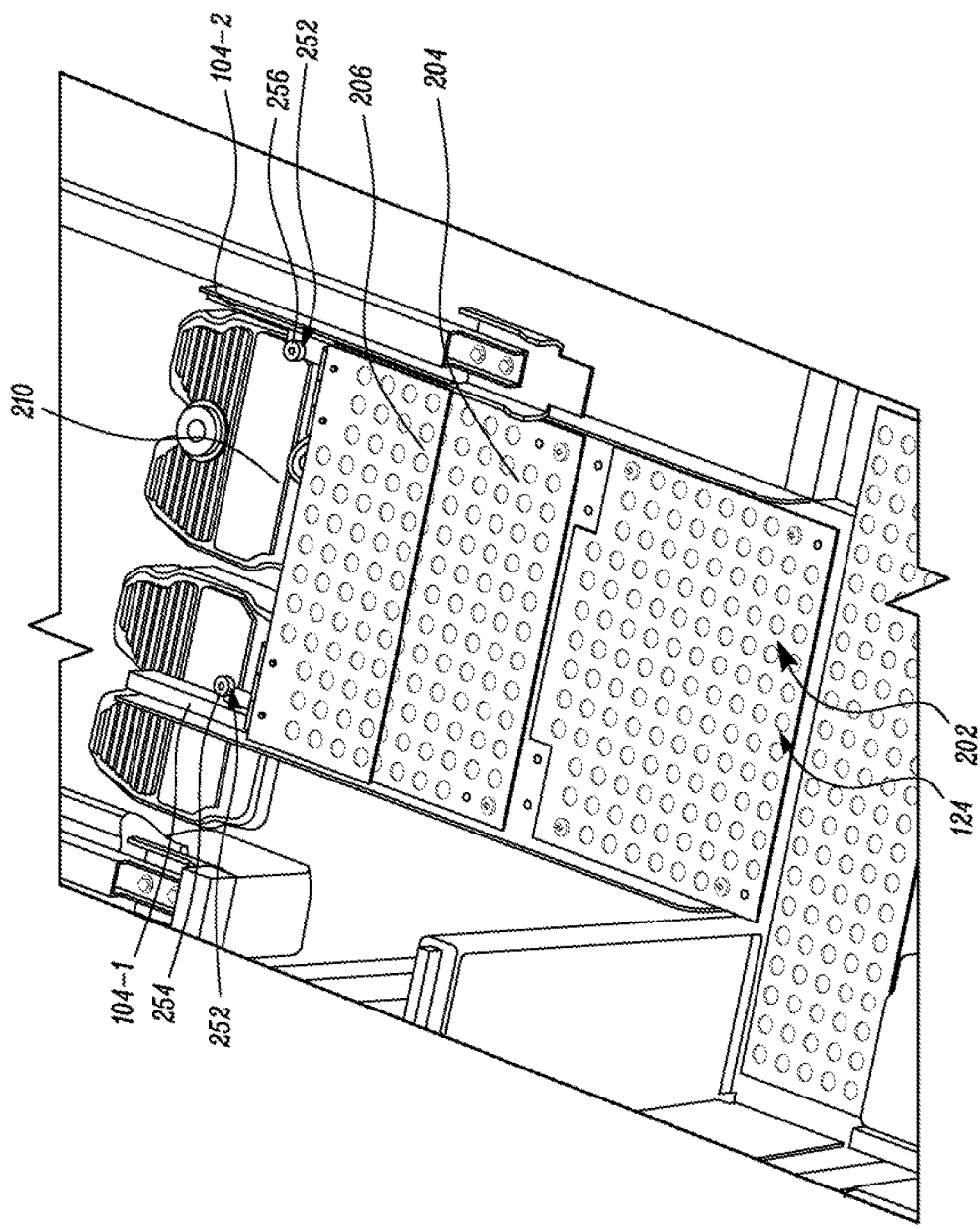
FIG. 4 illustrates the portion of the machine having the service access walkway where the walkway section is in an open position, in accordance with the embodiments of the present disclosure.

Referring to FIGS. 3 to 4, a portion of the machine 100 having the service access walkway 124 is shown. In an embodiment of the present disclosure, the service access walkway 124 includes a treaded top surface 202 to provide a safe and non-slippery standing surface for the service personnel and/or the operator of the machine 100 to stand on while servicing the serviceable components of the machine 100.

According to an embodiment of the present disclosure, the service access walkway 124 includes a first walkway section 204 and a second walkway section 206 pivotally coupled to the first walkway section 204 by a hinged connection 208. The second walkway section 206 is configured to pivot between a closed position and a series of open positions and wherein the second walkway section 206 is configured to overlay at least one serviceable component when in the closed position. In an embodiment of the present disclosure, the second walkway section 206 is configured to pivot by an angle α from the closed position to transition to one or more open positions of the second walkway section 206 (shown in FIG. 6). For example, in the illustrated embodiment, the series of open positions includes a first open position where the second walkway section 206 pivots by 180 degrees from the closed position to lay flat atop the first walkway section 204 (shown in FIGS. 4 and 6). In another example, the second walkway section 206 may pivot by only 90 degrees to provide access to the serviceable component.

In one example, the at least one serviceable component is an engine oil cap 210 (as shown in FIG. 4) which lies underneath the second walkway section 206 and needs to be accessed during the servicing of the machine 100 to fill engine oil. It may be contemplated that the second walkway section 206 as well as the first walkway section 204 of the service access walkway 124 may overlay other serviceable components of the machine 100 as well and that the engine oil cap 210 is merely exemplary and not intended to be limiting the scope of the claimed subject matter in any manner.

Figure 5:
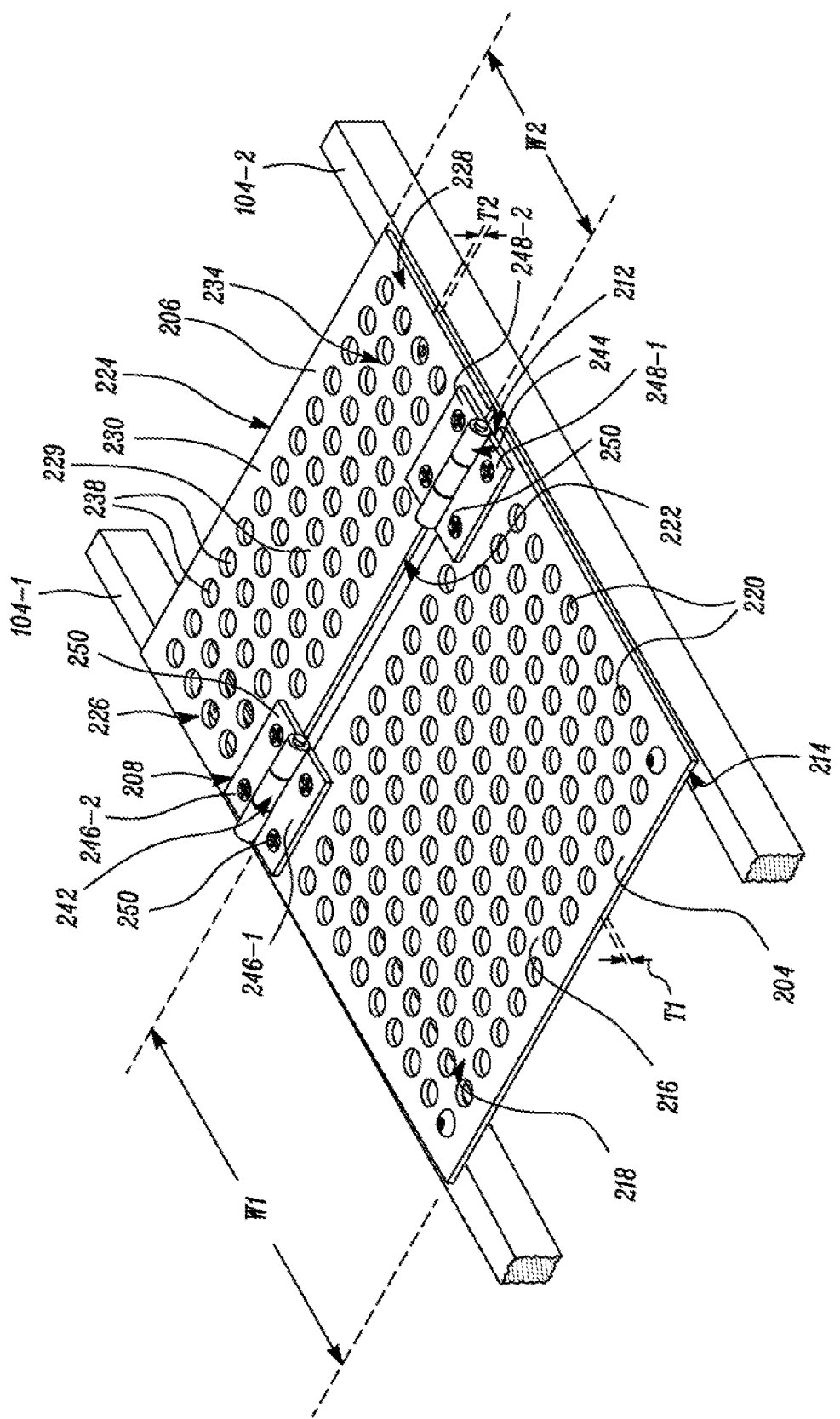
FIG. 5 illustrates a perspective view of the service access walkway having the walkway section in a closed position, in accordance with the embodiments of the present disclosure.

The first walkway section 204 is configured to be detachably coupled to the frame 104 of the machine 100, such as by one or more fasteners (not shown). The first walkway section 204 includes a first edge surface 212 and a second edge surface 214 opposite to the first edge surface 212, thereby defining a width of the first walkway section 204 (shown in FIG. 5). Further, the first walkway section 204 defines a top surface 216 and a bottom surface (not shown) extending between the first edge surface 212 and the second edge surface 214 and also defines a thickness T1 of the first walkway section 204. As shown in FIGS. 3 to 5, the top surface 216 of the first walkway section 204 has a treaded surface 218, hereinafter referred to as the treaded surface 218 of the first walkway section 204. For example, the treaded surface 218 of the first walkway section 204 may include a number of treads 220, such as in the form of circular perforations provided on the top surface 216. Alternatively, the treads 220 may be in the form of projections or grooves provided on the top surface 216 of the first walkway section 204 and configured to provide an enhanced grip when the service personnel walks on or stands on the first walkway section 204.

Further, the second walkway section 206 includes a first midsection 222 and a second midsection 224 opposite to the first midsection 222, thereby defining a width W2 of the second walkway section 206. The second walkway section 206 further includes a first side portion 226 laterally extending away from the first midsection 222, such that the first side portion 226 lies between the first midsection 222 and the second midsection 224. Similarly, the second walkway section 206 includes a second side portion 228 laterally extending away from the first midsection 222 in a same direction as the first side portion 226 and lies between the first midsection 222 and the second midsection 224. Furthermore, a central portion 229 of the second walkway section 206 may extend between the first side portion 226 and the second side portion 228. The second walkway section 206 defines a top surface 230 and a bottom surface 232 (shown in FIGS. 4 and 6) extending between the first side portion 226 and the second side portion 228 to define a thickness T2 of the second walkway section 206. Similar, to the treaded surface 218 of the first walkway section 204, the top surface 230 of the second walkway section 206 also includes a treaded surface 234 (hereinafter referred to as the treaded top surface 234 of the second walkway section 206) configured to provide a non-slippery and safe standing surface. In an embodiment of the present disclosure, the bottom surface 232 of the second walkway section 206 also includes a treaded surface 236 (shown in FIGS. 4 and 6), hereinafter referred to as the treaded bottom surface 236 of the second walkway section 206, configured to provide a safe standing surface when in the open position. Both the treaded top surface 234 and the treaded bottom surface 236 may include treads 238 and 240 respectively, in the form of circular perforations. In one example, the treads 238, 240 on the treaded surfaces 234 and 236 may be in the form of a number of through holes provided therein. Alternatively, the treads 238 and 240 may be in the form of projections or grooves provided on the top surface 230 and the bottom surface 232 of the second walkway section 206. It may be contemplated that the treaded surfaces 218, and 234, 236 provided on the first walkway section 204 and the second walkway section 206 respectively, may be identical or different to one another and may include any other form of treads to achieve similar results.

In an embodiment of the present disclosure, the first edge surface 212 of the first walkway section 204 is pivotally coupled to the first midsection 222 of the second walkway section 206 by the hinged connection 208. In one example, the hinged connection 208 may include a first hinge 242 and a second hinge 244 provided towards the first side portion 226 and the second side portion 228 of second walkway section 206, respectively. The first hinge 242 and the second hinge 244 may each include various types of bearings (not shown) to form a barrel hinge as well as other types of hinges that would be apparent to a person skilled in the art. The first hinge 242 may include a first pair of coupling flanges 246-1, 246-2 configured to couple the first hinge 242 to the first walkway section 204 and the second walkway section 206. Similarly, the second hinge 244 may include a second pair of coupling flanges 248-1, 248-2 configured to couple the second hinge 244 to the first walkway section 204 and the second walkway section 206. As shown in FIG. 5, a number of fasteners 250 may be used to couple each of the first hinge 242 and the second hinge 244 with the first walkway section 204 and the second walkway section 206. Although there are two hinges shown to be pivotally coupling the first walkway section 204 and the second walkway section 206, it may be contemplated that any number of hinges may be used without deviating from the scope of the claimed subject matter.

The service access walkway 124 including both the first walkway section 204 and the second walkway section 206, may be formed of a rigid material, such as steel, iron, or other high tensile strength metallic material. Alternatively, the service access walkway 124 may be made of other composite material such as Kevlar, carbon graphite, or other high strength material. In a yet another embodiment, the service access walkway 124 may be formed of a rigid plastic material including a wide range of synthetic or semi-synthetic organic solids that are moldable.

In an embodiment of the present disclosure, the service access walkway 124 includes a magnetic assembly 252 (shown in FIGS. 4 and 6) disposed between the second walkway section 206 and the frame 104 of the machine 100. The magnetic assembly 252 is configured to magnetically engage the second walkway section 206 with the machine 100 when the second walkway section 206 is in the closed position (shown in FIG. 3). For example, the magnetic assembly 252 is provided between the second walkway section 206 and the frame 104 of the machine 100, such that the bottom surface 232 of the second walkway section 206 is magnetically engaged with the frame 104 of the machine 100 to retain the second walkway section 206 in the closed position.

Figure 6:
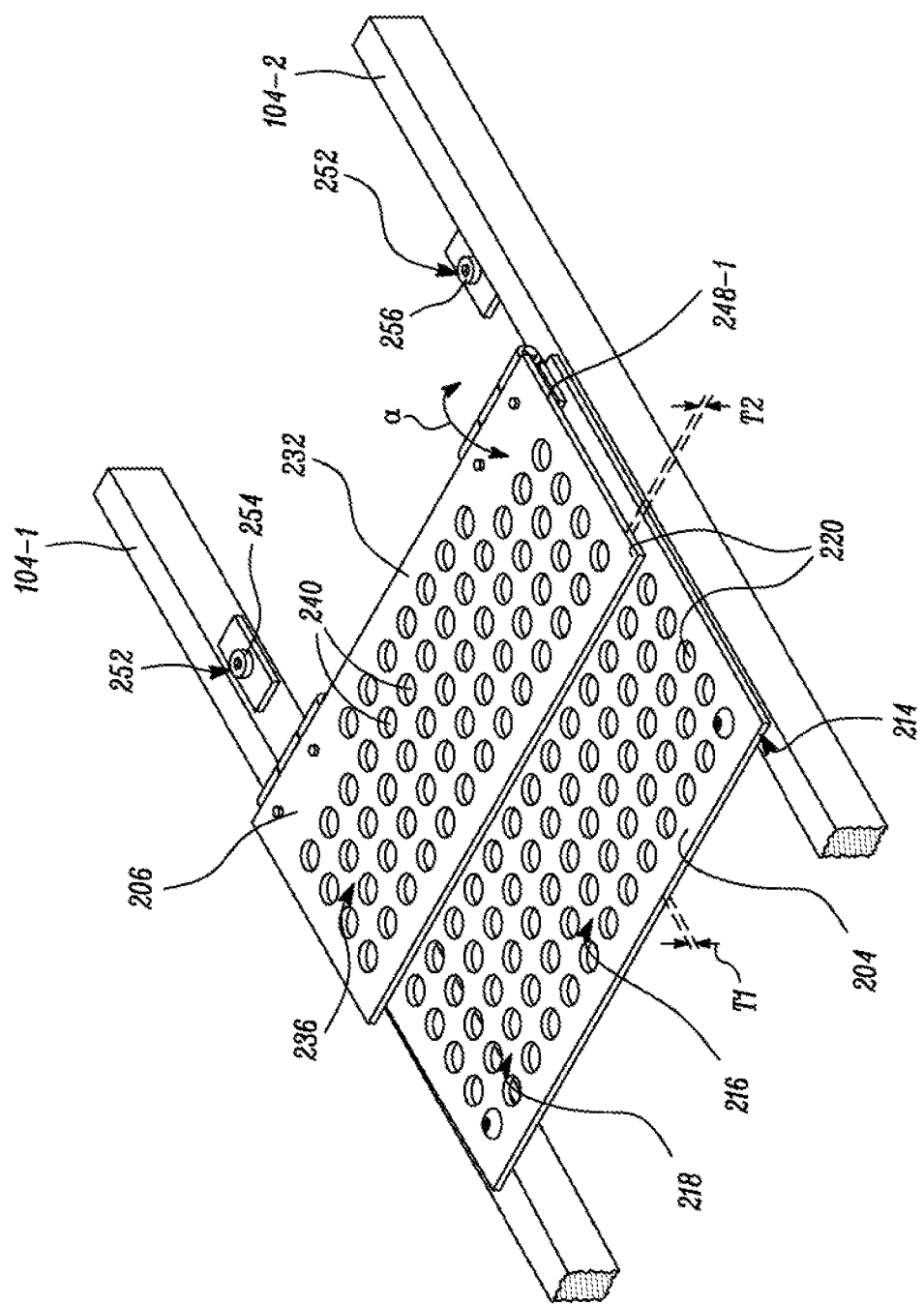
FIG. 6 illustrates the perspective view of the service access walkway having the walkway section in an open position, in accordance with the embodiments of the present disclosure.

In one example as shown FIG. 6, the magnetic assembly 252 may include a first magnet 254 configured to be positioned on a first portion 104-1 of the frame 104 that lies underneath the first side portion 226 of the second walkway section 206. Further, the magnetic assembly 252 may include a second magnet 256 configured to be positioned on a second portion 104-2 of the frame 104 that lies underneath the second side portion 228 of the second walkway section 206. In an alternative embodiment, a separate attachment bracket (not shown) may be mounted on the frame 104 and the magnetic assembly 252 may be positioned on the respective portions of the attachment bracket to magnetically engage the second walkway section 206 with the frame 104 of the machine 100. Although the magnetic assembly 252 is shown to include two magnets 254 and 256 positioned underneath the respective side portions of the second walkway section 206, it may be contemplated that the number and position of the magnets are merely exemplary and that the magnetic assembly 252 may include any number of magnets which may be positioned suitably to achieve similar results. For example, the magnetic assembly 252 may include a single magnet positioned adjacent to the engine oil cap 210 such that the bottom surface 232 of the second walkway section 206 is magnetically engaged with the machine 100 in a similar manner, to be retained in the closed position.

In a yet another embodiment, where the second walkway section 206 is made of a material other than metal, on or more metallic bars may be provided on the bottom surface 232 of the second walkway section 206 to magnetically engage with the magnetic assembly 252 and retain the second walkway section 206 in the closed position. Alternatively, the magnets 254, 256 may be disposed on the bottom surface 232 of the second walkway section 206 to magnetically engage with the metallic surface of the respective portions the frame 104 to retain the second walkway section 206 in the closed position.

Although the foregoing description describes only the second walkway section 206 being pivotally coupled to the first walkway section 204, it may be contemplated that all the walkway sections of the entire service access walkway 124 may be coupled to one another in a similar manner, without deviating from the scope of the claimed subject matter.

INDUSTRIAL APPLICABILITY

The service access walkway 124 according to the embodiments presented herein, provides a convenient way to access the serviceable components. Specifically, the components that lie underneath the walkway sections may be easily accessed by disengaging the magnetic engagement of the walkway sections with the machine 100. For example, when a service personnel wants to access the engine oil cap 210 that lies underneath the second walkway section 206, a force may be applied to disengage the magnetic engagement of the second walkway section 206 with the machine 100 and easily access the engine oil cap 210, without requiring unfastening of the entire service access walkway 124 using tools. Additionally, the treaded surface 236 provided on the bottom surface 232 of the second walkway section 206 provides safe standing surface even when the second walkway section 206 lays flat atop the first walkway section 204 in the open position.

While aspects of the present disclosure have been particularly depicted and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A service access walkway for a rotary mixer machine, the service access walkway comprising:
    a first walkway section;
    a second walkway section pivotally coupled to the first walkway section by at least one hinge and configured to pivot between a closed position and an open position, the second walkway including:
        a midsection;
        a first side portion laterally extending away from the midsection;
        a second side portion laterally extending away from the midsection in a same direction as the first side portion; and
        a top surface and a bottom surface extending between the first side portion and the second side portion; and
    a magnetic assembly configured to magnetically engage the second walkway section with the rotary mixer machine when the second walkway section is in the closed position.

2. The service access walkway of claim 1, wherein the magnetic assembly is configured to be disposed between a frame of the rotary mixer machine and the second walkway section to magnetically engage the bottom surface of the second walkway section with the frame when the second walkway section is in the closed position.

3. The service access walkway of claim 1, wherein the first walkway section is coupled to the midsection of the second walkway section by the at least one hinge.

4. The service access walkway of claim 1, wherein the magnetic assembly includes:
    a first magnet configured to be positioned on a first portion of a frame of the rotary mixer machine underneath the first side portion of the second walkway section; and
    a second magnet configured to be positioned on a second portion of the frame underneath the second side portion of the second walkway section to magnetically engage the bottom surface of the second walkway section with the frame when the second walkway section is in the closed position.

5. The service access walkway of claim 1, wherein the second walkway section is configured to pivot by 180 degrees from the closed position to lay flat atop the first walkway section, when the second walkway section is in the open position.

6. The service access walkway of claim 1, wherein the second walkway section has a treaded top surface and a treaded bottom surface.

7. A rotary mixer machine comprising:
    a frame;
    one or more serviceable components disposed on the frame; and
    a service access walkway to facilitate walkway access to the one or more serviceable components, the service access walkway including:
        a first walkway section detachably coupled to the frame;
        a second walkway section pivotally coupled to the first walkway section by at least one hinge, the second walkway section being in a closed position to overlay at least one serviceable component of the one or more serviceable components, wherein the second walkway section is pivotable about the at least one hinge to a series of open positions for providing access to the at least one serviceable component, the second walkway including:
            a midsection;
            a first side portion laterally extending away from the midsection;
            a second side portion laterally extending away from the midsection in a same direction as the first side portion; and
            a top surface and a bottom surface extending between the first side portion and the second side portion; and
        a magnetic assembly disposed between the frame and the second walkway section, the magnetic assembly being configured to magnetically engage the second walkway section with the frame when the second walkway section is in the closed position.

8. The rotary mixer machine of claim 7, wherein the first walkway section is coupled to the midsection of the second walkway section by the at least one hinge.

9. The rotary mixer machine of claim 7, wherein the magnetic assembly includes a first magnet positioned on a first portion of the frame underneath the first side portion of the second walkway section and a second magnet positioned on the frame underneath the second side portion of the second walkway section to magnetically engage the bottom surface of the second walkway section with the frame when the second walkway section is in the closed position.

10. The rotary mixer machine of claim 7, wherein the series of open positions include a first open position where the second walkway section pivots by 180 degrees from the closed position and lays flat atop the first walkway section.

11. The rotary mixer machine of claim 7, wherein the at least one serviceable component includes an engine oil cap.

12. The rotary mixer machine of claim 7, wherein the second walkway section has a treaded top surface and a treaded bottom surface.

13. A rotary mixer machine comprising:
a frame;
one or more serviceable components disposed on the frame; and
a service access walkway to facilitate walkway access to the one or more serviceable components, the service access walkway including:
a first walkway section detachably coupled to the frame;
a second walkway section pivotally coupled to the first walkway section by at least one hinge, the second walkway section being in a closed position to overlay at least one serviceable component of the one or more serviceable components, wherein the second walkway section is pivotable about the at least one hinge to an open position such that the second walkway section lays flat atop the first walkway section for providing access to the at least one serviceable component, the second walkway including:
a midsection;
a first side portion laterally extending away from the midsection;
a second side portion laterally extending away from the midsection in a same direction as the first side portion; and
a top surface and a bottom surface extending between the first side portion and the second side portion; and
a magnetic assembly disposed between the frame and the second walkway section, the magnetic assembly being configured to magnetically engage the second walkway section with the frame when the second walkway section is in the closed position.

14. The rotary mixer machine of claim 13, wherein the first walkway section is coupled to the midsection of the second walkway section by the at least one hinge.

15. The rotary mixer machine of claim 13, wherein the magnetic assembly includes a first magnet positioned on a first portion of the frame underneath the first side portion of the second walkway section and a second magnet positioned on a second portion of the frame underneath the second side portion of the second walkway section to magnetically engage the bottom surface of the second walkway section with the frame.

16. The rotary mixer machine of claim 13, wherein the at least one serviceable component includes an engine oil cap.

17. The rotary mixer machine of claim 13, wherein the second walkway section has a treaded top surface and a treaded bottom surface.

* * * * *